(12) United States Patent
Postma et al.

(10) Patent No.: US 6,224,288 B1
(45) Date of Patent: May 1, 2001

(54) CORRUGATED SLIDER WASHER BEARING

(75) Inventors: Robert W. Postma, Los Angeles; Robert B. Pan, Torrance, both of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/212,496

(22) Filed: Dec. 14, 1998

(51) Int. Cl.$^7$ ................................................ F16B 43/00
(52) U.S. Cl. ........................... 403/30; 411/531; 411/534; 411/545
(58) Field of Search .................... 411/531, 534, 411/535, 536, 545, 547, 149, 150, 154, 160, DIG. 2; 403/28, 29, 30

(56) References Cited

U.S. PATENT DOCUMENTS

| | | | |
|---|---|---|---|
| 627,938 | * | 6/1899 | Long ................................. 411/160 |
| 629,699 | * | 7/1899 | McQueen ........................... 411/545 |
| 2,952,344 | * | 9/1960 | Pope . |
| 4,214,444 | * | 7/1980 | Fujioka . |
| 5,364,214 | * | 11/1994 | Fazekas .............................. 411/536 |
| 5,385,433 | * | 1/1995 | Calandra ............................ 411/545 |
| 5,439,309 | * | 8/1995 | Lhernould . |

* cited by examiner

Primary Examiner—Flemming Saether
(74) Attorney, Agent, or Firm—Derrick Michael Reid

(57) ABSTRACT

A slider washer bearing in a bolted interface assembly allows relative differential thermal expansion and contraction motion between a component plate fastened to a base plate by a bolt, without inducing large strains and stresses upon the plates or the bolt. The slider washer bearing, thereby, functions as a thin spacer between the component and base plates, enabling high preload tightening of the bolted assembly while also enabling relative uni-directional alternating motion of the plates. The slider washer includes at least one mating groove arranged unidirectionally and extending horizontally between the top and bottom flexure plates. The grooves provide a guide for relative alternating back and forth unidirectional motion while the full strength of the bolt remains available to support the component plate without allowing high friction shear forces.

2 Claims, 2 Drawing Sheets

CORRUGATED SLIDER WASHER BEARING

CORRUGATED WASHER BEARING ASSEMBLY

CORRUGATED SLIDER WASHER BEARING

REFERENCE TO RELATED APPLICATION

The present application is related to assignee's copending applications entitled "Roller Washer Bearing and Method" Ser. No.: 09/119,511 filed Jul. 20, 1998, "Flexure Washer Bearing and Method" Ser. No.: 09/119,510, Filed: Jul. 20, 1998.

The present application is related to applicant's copending application entitled "Clip Flexure Washer Bearing" Ser. No. 09/212,497, filed Dec. 14, 1998.

STATEMENT OF GOVERNMENT INTEREST

The invention was made with Government support under contract F04701-93-C-0094 by the Department of the Air Force. The Government has certain rights in the invention.

FIELD OF THE INVENTION

The invention relates to the field of mechanical washers and bearings and mechanical assemblies subjected to thermal expansion stresses and differential motion during temperature variations.

BACKGROUND OF THE INVENTION

Changes in temperature can cause excessive thermal stresses at the attachment points between arbitrary parallel plates of a mechanical assembly, such as a top component plate and a bottom base, both rigidly fastened together. An example of such a mechanical assembly is a high precision optical instrument assembly or inertial guidance unit on a spacecraft. The unit has an aluminum housing bolted to a graphite-epoxy honeycomb support base structure. The instrument and/or the support base are subjected to large changes in orbital temperature with resulting differential expansions between the base structure and the instrument. The top component plate and the bottom base plate could be fastened together using conventional fastening bolts, nuts and washers, through aligned holes extending through the component and base plate. The top component plate and the bottom base plate may have substantially different coefficients of thermal expansion. The resulting unequal amounts of expansion or contraction, if constrained, can cause significant locally induced strains and stresses. During temperature variations, the top component plate may expand and contract at a different rate than the bottom base plate, thereby tending to misalign the base holes and placing stresses upon the bolts extending through the fastening holes, leading to stress and even eventual failure of the bolt. The differential in the thermal expansion can also lead to damage to the component plate and base plate, or may result in misalignment of precision mounted instruments. These and other disadvantages are eliminated or reduced using the invention.

SUMMARY OF THE INVENTION

An object of the invention is to provide a linear slider washer bearing that reduces stresses in an assembly having fastening bolts extending between a component plate and a base plate, both expanding and contracting at differing rates during temperature variations.

Another object of the invention is to provide a method of rigidly fastening the component and base plates together using a linear flexure washer bearing, thus enabling the component and base plates to expand and contract at differing rates during temperature variations without inducing excessive stresses in the component or base plate.

The present invention is directed to a corrugated slider washer bearing. The corrugated slider washer bearing comprises a pair of sliding washer plates each having one or more mating parallel extending corrugated grooves. A bolt hole extends through the top and bottom washer plates for fastening a component plate and a base plate together. The top washer plate mates with the bottom washer plate, and the top washer plate can unidirectionally slide upon the bottom washer plate. The top washer plate can slide relative to the bottom plate along one direction in the presence of horizontal loads upon the top washer plate relative to the bottom washer plate.

The sliding plates are formed to be disposed in alignment around a bolt hole having a larger diameter than a fastening bolt extending through the bolt hole in the top component plate and into the bottom base plate into which is rigidly fastened the bolt. The bolt fastens together the top component plate, the bottom base plates and the two flexure washer bearings. In the preferred form, a bottom slider bearing is disposed between the bottom base plate and the top component plate and another top slider bearing is disposed between the bolt head and the top component plate, with the bolt rigidly fastened into the bottom base plate. As the top component plate expands or contracts relative to the bottom base plate during temperature variations, the bottom slider washer plate of the bottom slider washer bearing remains rigidly affixed to the bottom component plate and the top slider washer plate of the top slider washer bearing remains rigidly affixed to the bolt head, as the bottom washer plate of the top washer bearing and the top washer plate of the bottom washer bearing remain affixed to the top component plate, to enable the expansion and contraction of the top component plate in plane relative to the base plate without placing excessive stresses upon the bolt. As the top component plate expands or contracts, the hole in the top component plate moves in misalignment relative to the hole in the bottom base plate. At all times, the bolt remains in a rigid vertical and orthogonal position relative to the horizontally extending assembly. The hole in the component plate being larger than the bolt stem creates sufficient space for the relative movement without the top component plate inducing excessive stresses in the fastening bolt. The corrugated grooves in the slider washer bearing enable sliding movement along one direction of the thermal expansion and contraction of the base and component plates, while constraining sliding motions in all other directions.

The invention minimizes interface stresses by allowing relative differential motion between the component plate and base plate fastened by a bolt. The full strength of the bolt is available to support the component plate. The strength of the bolted assembly is not compromised in the presence of relative thermal expansion and contraction. The sliding of the washer bearing avoids excessive friction shear forces. The washer bearings function as thin spacers between the component and base plates, thus enabling high preload tightening of the bolted assembly. These and other advantages will become more apparent from the following detailed description of the preferred embodiment.

DETAILED DESCRIPTION OF THE PREFERRED EMBODIMENT

Figure 1:
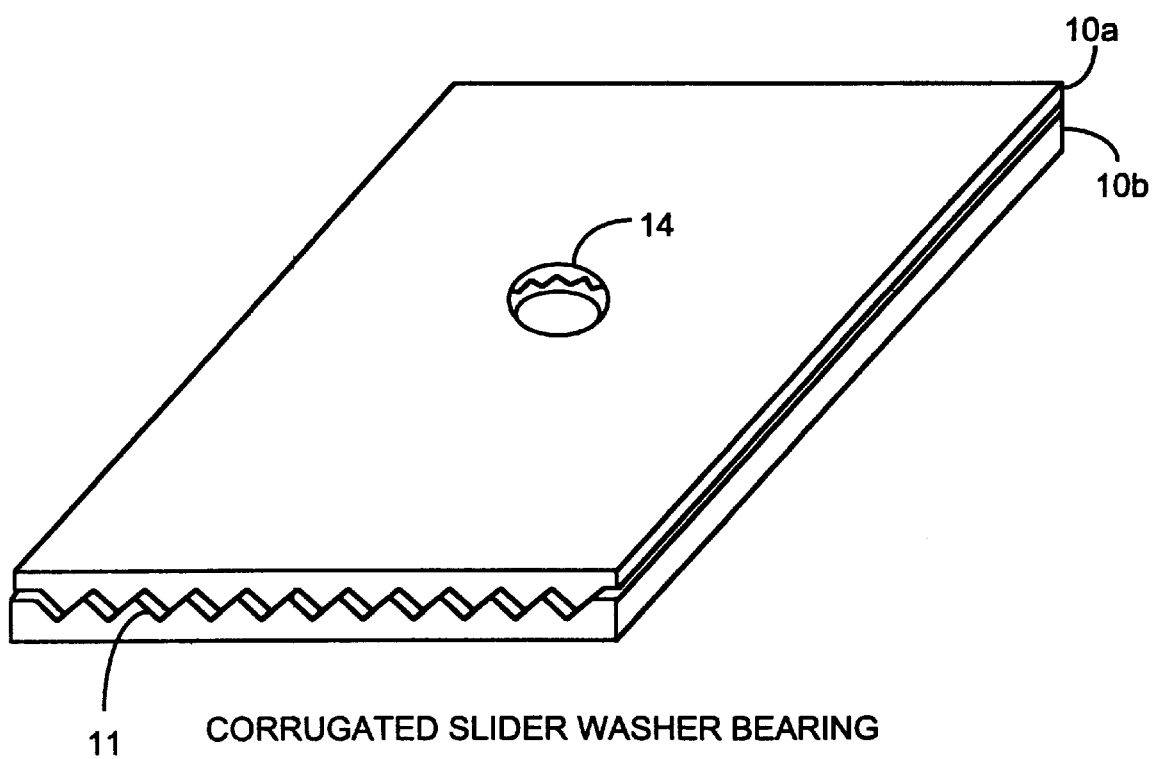
FIG. 1 is a drawing of a corrugated slider washer bearing.

An embodiment of the invention is described with reference to the figures using reference designations as shown in the figures. Referring to FIG. 1, a corrugated slider washer bearing 10 consists of a top corrugated slider plate 10a and a bottom slider plate 10b, the two plates 10a and 10b having matching opposing corrugated grooves 11 extending in parallel the length of the slider 10. The slider washer bearing 10 is optionally made of a plurality of grooves 11, but only one grove needs to be provided. A washer hole 14 is disposed preferably in the center of the slider washer bearing 10. The grooves 11 can be lubricated with a suitable lubricant so that the top washer plate 10a and bottom washer plate 10b can slide in contact with each, horizontally back and forth small distances relative to each other in a direction orthogonal to the planes of the slider bearing 10. The slider bearing 10 can be machined from high strength metal alloys such as steel, titanium, beryllium copper, or aluminum. The top plate 10a and bottom plate 10b are preferably machined as mating pairs. The corrugated grooves extend the length of the slider plates 10a and 10b. The top and bottom plates 10a and 10b need not be the same thickness. The grooves 11 should be deep enough to prevent movement other than along the length of the grooves. The sliding bearing 10 is shown generally in the shape of a square, but other shapes, such as a circle, could be used as well.

Figure 2:
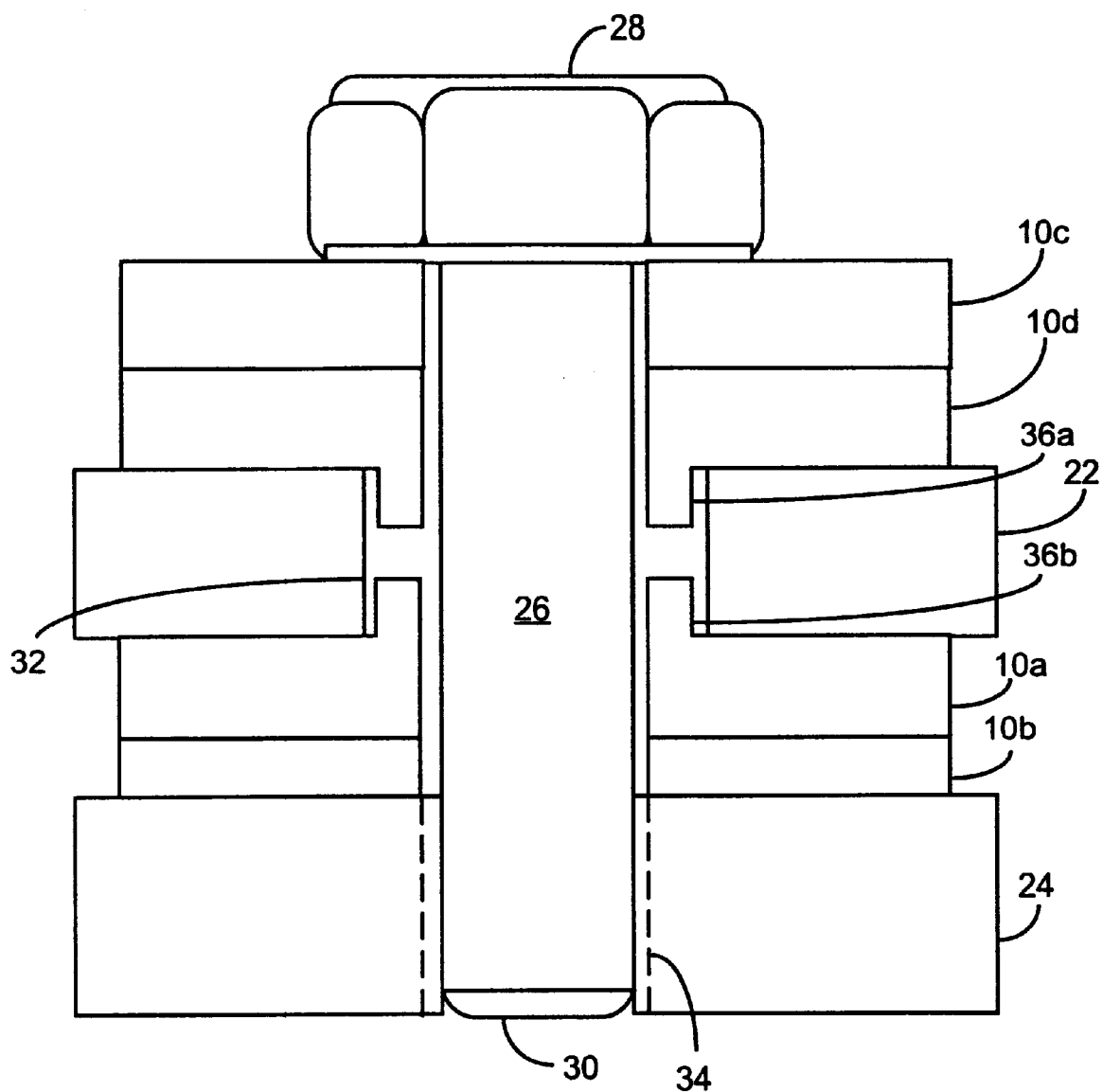
FIG. 2 is a drawing of a corrugated slider washer bearing assembly.

Referring to FIG. 2, a corrugated washer bearing assembly is shown having a corrugated slider washer bearing consisting of top and bottom plates 10a and 10b, and having another slider washer bearing 10c and 10d without corrugations. The corrugated washer bearing assembly is used to enable relative horizontal motion between a top component plate 22 and a bottom base plate 24. The slider washer bearings 10ab and 10bd are arranged to extend along the relative thermal expansion and contraction motion of the top component plate 22 relative to the bottom base plate 24, a left to right direction relative to viewing FIG. 2. The corrugated slider washer bearing 10ab constrains all other translatory motion of the component plate 22 relative to the base plate 24. A bolt 26 comprising a threaded stem 26 and bolt head 28 extends vertically through the plates 22 and 24, through a bore hole 32 in the top component plate 22 and a threaded hole 34 in the bottom base plate 24. The holes 32 and 34 are in initial alignment when the top and bottom plates 22 and 24 are initially fastened together. The base plate 24 could be a honeycomb structure having a low coefficient of thermal expansion whereas the component plate 22 may be an aluminum plate having a high thermal coefficient. The relative movement between the plates 22 and 34 may be, for example, between 0.002 and 0.006 inches over a typical temperature range.

The slider washer bearings 10ab and 10cd may have pilot registrations 36a and 36b for centering the bearings 10a and 10b into the hole 32. The registrations 36a and 36b are optional circular vertically extending flanges initially centered within bolt hole 32 to align the bearings 10a and 10b to the bolt hole 32. As shown, the hole 32 is larger than the diameter of the registrations 36a and 36b, and much larger than the diameter of the bolt stem 30, so that the top component plate 22 can move horizontally relative to the bottom base plate 24 while the bolt 36 remains in a vertical position while rigidly affixed to, preferably screwed into, the bottom base plate 24.

The slider washer bearings 10ab and 10cd are disposed in alignment around a bolt hole 32 having a larger diameter than the fastening bolt stem 30 extending through the bolt hole 32 in the top component plate 22 and into the bottom base plate 24 into which the bolt 26 is rigidly fastened. The bolt 28 fastens together the top component plate 22, the bottom base plate 24 and the two slider washer bearings 10ab and 10cd. The slider washer bearing 10ab is disposed between the bottom base plate 24 and the top component plate 22, and the top slider bearing 10bd is disposed between the bolt head 28 and the top component plate 22. As the top component plate 22 expands or contracts back and forth in slight horizontal alternating unidirectional movement relative to the bottom base plate 24 during temperature variations, the bottom washer plate 10d of the top washer 10ab remains rigidly affixed to the top of the component plate 24, and, the top slider plate 10a of the bottom washer bearing 10ab remains rigidly affixed to the bottom of the top component plate 22, as the bottom washer plate 10b of the bottom slider washer bearing 10ab, and the top washer plate 10a of the bottom washer bearing 10ab remain affixed to the bottom of the top component plate 22. The expansion and contraction differential motion of the top component plate 22 relative to the base plate 24 does not place excessive stresses upon the bolt 26. As the top component plate 22 moves back and forth, the hole 32 in the top component plate 22 moves in misalignment relative to the thread hole 34 in the bottom base plate 24. At all times, the bolt 26 remains in a rigid vertical and orthogonal position relative to the horizontally extending plates 22 and 24. The hole 32 in the component plate 22 is larger than bolt stem 30 to create sufficient circumferential space around the stem 30 for the relative movement of the top component plate 22 without the top component plate 22 inducing stresses due to contact with the fastening bolt 26.

One corrugated washer bearing 10ab is used to constrain lateral motion. Preferably, as least one slider washer bearing 10ab is disposed between the top component plate 22 and bottom base plate 24 with a bolt 26 extending rigidly and vertically between the base and component plates 22 and 24.

In many applications, such as with the use of large circular component and base plates, the expansion and contraction is radial relative to the centers of the circular component to a plurality of circumferentially disposed mounting bolts 26. The slider washer bearing 10ab can be disposed to align sliding motion to this radial relative movement, and as such, the grove 11 enables radial relative movement, while resisting circumferential relative movement between the component and base plates 22 and 24. Thus, the washer bearings 10ab provide a single degree of freedom of alternating unidirectional relative motion in the radial direction of the plates 22 and 24. The slider washer bearing 10ab enables movement in one direction by restraining relative motion in other translatory and rotational directions.

The slider washer bearing is an assembly used as a load bearing mechanism for disposition between two mounting plates having relative movement, which may be caused, for example, by thermal cycling. The slider plates avoid interface friction shear forces, and when properly lubricated enhance sliding action. The full strength of the bolt with normal preloads can be maintained to support components on the mounting plate. The grooves 11 are arranged in parallel along the alternating unidirectional motion. The grooves can come in a variety of forms, such as in varying depths, shapes and number of grooves. Those skilled in the art can make enhancements, improvements and modifications to the invention. However, those enhancements, improvements and modifications may nonetheless fall within the spirit and scope of the following claims.

What is claimed is:

1. An assembly, the assembly comprising
an upper plate having a flat bottom surface with an upper aperture,
a lower plate having a flat top surface with a lower aperture aligned with the upper aperture, the upper aperture alternately unidirectionally moving relative to the lower aperture, a fastening bolt extending between the upper and lower plates within the upper and lower aperture, the fastening bolt for providing a loading force between the upper plate and the lower plate, and a washer bearing comprising:

(a) a top slider plate having at least one top groove aligned with the unidirectional movement and in parallel to the upper and lower plates, the top groove extends between the upper plate and the lower plate for supporting the loading force, the top groove provides a guide for sliding back and forth in alternating unidirectional motion in parallel alignment with the alternating relative movement of the upper and lower apertures, the top slider plate has a top flat surface for buttressing the flat bottom surface of the upper plate;

(b) a bottom slider plate having at least one bottom groove aligned with the unidirectional movement and in parallel to upper plate and lower plate, the bottom groove extends between and in parallel to the upper plate and the lower plate for supporting the loading force, the bottom groove mates to the top groove to provide a guide for sliding back and forth in alternating unidirectional motion in parallel alignment with the alternating relative movement of the upper and lower apertures, the bottom slider plate has a flat bottom surface for buttressing the flat top surface of the lower plate; and (c) a washer aperture in the top and bottom slider plates in alignment with the upper and lower apertures for receiving the fastening bolt, the washer aperture being larger than the fastening bolt for providing space around the fastening bolt for enabling the fastening bolt to move relative to at least one of the top and bottom slider plates as the top and bottom slider plate slide back and forth as the upper aperture alternately and unidirectionally moves back and forth relative to the lower aperture after applying the loading force by the fastening bolt.

2. The slider washer bearing of claim 1 wherein the at least one groove is a plurality of grooves disposed in parallel in the top and bottom slider plates.

* * * * *